Patented July 8, 1941

2,248,826

UNITED STATES PATENT OFFICE 2,248,826

RECOVERY OF ALUMINA

Jean Charles Séailles, Paris, France, and Walter Robert Gustav Dyckerhoff, Mainz-Amoneburg, Germany; said Dyckerhoff assignor to said Séailles No Drawing. Application July 19, 1938, Serial No. 220,002. In Luxemburg August 2, 1937

9 Claims. (Cl. 23—143)

Our invention relates to the recovery of alumina from impure raw materials containing aluminium compounds and more especially to a process, wherein alumina of highest purity can be recovered from these compounds in a particularly advantageous manner.

Hitherto a great variety of processes have been suggested for the recovery of alumina from raw materials containing aluminium compounds. The raw materials have for instance been treated with acids in order to render the aluminium compounds soluble and to separate the alumina from these solutions. Other processes were based on the basic decomposition of the raw material, for instance by acting thereon with soda, whereby the aluminium compounds were recovered in the form of sodium aluminate. Hitherto this treatment could be applied successfully only to materials such as bauxite containing a very high percentage of alumina.

We have now made the surprising discovery that also from impure materials such as clay, which contain besides alumina also a high and even preponderant percentage of other substances, alumina of the highest purity can be recovered by subjecting the raw material to thermic decomposition in the presence of alkaline earth compounds such as lime and subsequent dissolving of the alkaline earth aluminates in water.

Our process can be applied to materials which are distinguished from bauxite by a higher content of silica.

That purest alumina could be produced in this manner from raw materials comparatively poor in alumina and rich in silica, appeared highly improbable, the more so as the constitution of such raw materials does not fall in line with Rankin's diagrams which are known to determine the range of materials adapted for the recovery of alumina. In view of these diagrams it was the general belief that products of decomposition of materials poor in alumina could merely be regarded as ternary compounds insoluble in water.

We have now found that by decomposition of the starting material, for instance with lime, the alumina is converted almost exclusively into calcium aluminates, which can be dissolved by lixiviation with water or aqueous liquids, while the other substances including iron, silica and titanic acid remain over as insoluble residue. Owing to this circumstance we are enabled, in spite of the high percentage of accompanying substances, to recover an alumina which is altogether free from the foreign matter contained in the starting material.

The process according to our invention can be applied with equal success to clay, slate, metallurgical slags, ashes, minerals containing coal and accompanying the coal, gathering and washery wastes and similar substances. Some of these materials, owing to their natural properties, offer the greatest resistance to any chemical decomposition, such as for instance the more or less dehydrated and petrified slate and alumina silicates, and also materials such as slags and ashes which have gone through a burning operation whereby they have become very difficultly decomposable by chemical means.

All these materials can be treated in the manner aforesaid with particular advantage, provided that the addition of the lime before calcination, and also the calcination process itself is so regulated that the best solubility and the most favorable caustic relations are obtained. The best mode of regulation is preferably determined by corresponding preliminary tests. As regards the addition of lime, it is a general rule that the proportion of lime is calculated for the formation of monocalcium aluminate, bicalcium silicate and monocalcium titanate, if desired also bicalcium ferrite, at the same time adding between 5 and 18%, preferably 10–12%, lime in excess of the calculated proportion.

The iron content need not be considered, provided it is very low or calcination is effected in reducing surroundings.

The molecular proportion between the lime and the other substances can be expressed as follows:

$$1SiO_2 : 2CaO$$
$$1Al_2O_3 : 1.3\text{--}2.0CaO$$
$$1TiO_2 : 1\text{--}2CaO$$

and eventually $$1Fe_2O_3 : 2CaO$$

If the residual matter obtained in the lixiviation of the calcium aluminate is intended to be used in the production of cement, the percentage of lime should reach, or even exceed the upper limit. In that case the iron may be extracted from the residual matter, or already from the product of decomposition, by flotation or by magnetic separation.

In order to be able to recover the residues of the lixiviation process a cement of low shrinkage and highest resistivity against corrosive influences, it is advisable to accurately adapt the lixiviation process to the percentage of alumina in the residual matter in such manner that not only the content of alumina is kept as low as possible, but also the minimum prescribed for such cements is not understepped.

When using coal-bearing shale or bituminous shale or also coal-bearing minerals accompanying the coal, the further advantage is obtained that the combustible matter contained in the material, which would otherwise not be utilisable, furnishes part of the calories required for the burning.

If the percentage of iron is high, burning in a reducing atmosphere, when decomposing the starting material with lime by a thermical treatment, also enables us to recover metallic iron, which may then be separated in a suitable manner from the product of decomposition containing calcium aluminate or, after lixiviation of this product, from the residue.

As a rule the products of the burning process according to this invention have the property of crumbling at once provided they are not cooled down too quickly. This property can be utilized in the case where finely distributed products shall be produced directly. We are thus enabled to avoid, at least partly, the grinding of the product of decompostion.

We have further found that by an addition of about 1-5% gypsum to the comminuted product of decomposition lixiviation is greatly expedited. The gypsum may be added before, during or after comminution under the form of anhydrite or anhydrous gypsum.

In practicing our invention, we may for instance proceed as follows:

Example 1

Starting from a kaolin of the following constitution

| | |
|---|---|
| $SiO_2$ | 45.94 |
| $Al_2O_3$ | 38.36 |
| $Fe_2O_3$ | 1.04 |
| CaO | 0.45 |
| MgO | 0.24 |
| Alkali | 1.22 |
| Calcination losses | 12.75 |
| | 100.00 | the starting material was intimately mixed with the quantity of lime stone required to yield, after burning, a product exactly corresponding to the formula $$xSiO_2 2CaO + yAl_2O_3 CaO$$

The burnt product was constituted as follows:

| | |
|---|---|
| $SiO_2$ | 24.03 |
| $Al_2O_3$ | 19.44 |
| $Fe_2O_3$ | 0.60 |
| CaO | 55.54 |
| MgO | 0.39 |
| | 100.00 |

The ratio of lime to alumina and silica corresponds to the above formula. The burnt product was lixiviated with water and the calcium aluminate solution thus obtained was treated further, in a well known manner, for the recovery of alumina.

Regardless of the temperature and duration of the burning process we have found that the recovery of alumina by dissolving the burnt product in water never yielded more than 50% of the alumina contained in the burnt product.

Example 2

Further tests were carried through with a burnt product obtained from a kaolin such as described with reference to Example 1, however with the addition of greater quantities of lime stone, the constitution of the material being

| | |
|---|---|
| $SiO_2$ | 23.04 |
| $Al_2O_3$ | 17.83 |
| $Fe_2O_3$ | 0.69 |
| CaO | 58.28 |
| MgO | 0.16 |

This starting material was exposed 45 minutes to a temperature of 1350° C. From the burnt product 92% of the alumina could be recovered in solution by treating the burnt product with water. By increasing the quantity of lime stone or lime added one thus obtained products containing alumina which possess a higher dissolving capacity in water.

Similar tests were made with carbonaceous shale and with wastes from the coal washery, these materials being constituted as follows:

| | Per cent |
|---|---|
| Calcination losses | 40.5 |
| $SiO_2$ | 28.0 |
| $Fe_2O_3$ | 6.3 |
| $Al_2O_3$ | 16.7 |
| MnO | 0.1 |
| CaO | 3.0 |
| MgO | Traces |
| $CO_3$ | 1.6 |

The calculated percentage of $CaCO_3$ required in accordance with the formula $SiO_2.2CaO$ or $Al_2O_3.CaO$, when burning in reducing surroundings and without considering the $Fe_2O_3$, would be 105 parts by weight $CaCO_3$ per 100 parts carbonaceous shale of the above constitution.

The able here below shows the lime in excess of the calculated requirements and the yield, calculated on the $Al_2O_3$ in the clinker.

| Excess of lime, per cent | Yield, per cent |
|---|---|
| −3 | 18 |
| +5 | 23 |
| +7 | 86 |
| +11 | 84 |
| +13 | 96 |
| +16 | 65 |
| +28 | 46 |

Various changes may be made in the details disclosed in the foregoing specification without departing from the invention or sacrificing the advantages thereof.

We claim:

1. The process of recovering alumina of high purity from materials containing insoluble aluminum compounds and a significant percentage of foreign matter including an insoluble silicon derivative, which comprises calcining a mixture of this material with a basic calcium compound whereby a highly water soluble calcium aluminate is formed, said calcium compound being employed in the ratio calculated according to the formula $1SiO_2:2CaO$
$1Al_2O_3:1.3-2.0CaO$
$1TiO_2:1-2CaO$ followed by lixiviation with an aqueous liquid to separate the soluble calcium aluminate from the insoluble calcium silicate and treating this calcium aluminate solution for the recovery of high purity alumina.

2. The process of recovering alumina of high purity from a material containing insoluble aluminum compounds and a significant percentage of foreign matter including an insoluble silicon derivative, which comprises calcining a mixture of this material with a basic calcium compound whereby a highly water soluble calcium aluminate is formed, said calcium compound being employed in the ratio calculated according to the formula $1SiO_2:2CaO$
$1Al_2O_3:1.3-2.0CaO$
$1TiO_2:1-2CaO$
$1Fe_2O_3:2CaO$ followed by lixiviation with an aqueous liquid to separate the soluble calcium aluminate from the insoluble calcium silicate and treating this calcium aluminate solution for the recovery of high purity alumina.

3. The process of claim 2, in which decomposition is carried through in a reducing atmosphere.

4. The process for producing cement which comprises treating by calcining a material, containing insoluble aluminum compounds and a significant percentage of foreign matter including an insoluble silicon derivative, with an admixed basic calcium compound whereby a highly water soluble calcium aluminate is formed, said calcium compound being employed in the ratio not less than according to the formula $1SiO_2:2CaO$
$1Al_2O_3:2CaO$
$1TiO_2:2CaO$ followed by a controlled lixiviation with an aqueous liquid which does not chemically alter components of the calcined mass whereby the content of alumina in the residue is kept in the range for a low shrinkage cement with a high resistivity against corrosion.

5. In the process of claim 1 the step of allowing the product of decomposition to cool down slowly.

6. In the process of claim 1 the step of adding to the product of decomposition a quantity of $CaSO_4$ ranging between 1 and 5%, before it is lixiviated.

7. The process of recovering alumina of high purity from impure materials containing insoluble aluminum compounds and a significant percentage of foreign matter including silica which comprises calcining a mixture of this material with a basic calcium compound whereby a highly water soluble calcium aluminate is formed, said calcium compound being employed in amounts from 5 to 28% inclusive over that calculated to form mono-calcium aluminate, bi-calcium silicate, followed by lixiviation with an aqueous liquid to separate the calcium aluminate from the insoluble calcium silicate, and treating this calcium aluminate solution for the recovery of high purity alumina.

8. The process of claim 7, wherein the fusion mixture is allowed to cool down slowly after the calcination is finished.

9. The process of recovering alumina of high purity from impure materials containing insoluble aluminum compounds and a significant percentage of silica, and a percentage of insoluble titanium compounds, which comprises calcining a mixture of this material with a basic calcium compound whereby a highly water soluble calcium aluminate is formed, said calcium compound being employed in amounts from 5 to 28% inclusive over that calculated to form monocalcium aluminate, bicalcium silicate and monocalcium titanate, followed by lixiviation with an aqueous liquid to form a solution of calcium aluminate, then separating this solution from the residue, and treating this calcium aluminate solution for the recovery of high purity alumina.

JEAN CHARLES SÉAILLES.
WALTER ROBERT GUSTAV DYCKERHOFF.